(12) United States Patent
Namuduri et al.

(10) Patent No.: US 9,216,707 B2
(45) Date of Patent: Dec. 22, 2015

(54) MOTOR GENERATOR UNIT WITH MULTIPLEXED OUTPUT

(71) Applicant: GM GLOBAL TECHNOLOGY OPERATIONS LLC, Detroit, MI (US)

(72) Inventors: Chandra S. Namuduri, Troy, MI (US); Michael G. Reynolds, Troy, MI (US); Thomas Wolfgang Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 96 days.

(21) Appl. No.: 14/208,484

(22) Filed: Mar. 13, 2014

(65) Prior Publication Data

US 2015/0258950 A1    Sep. 17, 2015

(51) Int. Cl.
| | |
|---|---|
| *B60L 1/00* | (2006.01) |
| *B60R 16/03* | (2006.01) |
| *B60W 20/00* | (2006.01) |
| *B60L 15/20* | (2006.01) |
| *B60L 11/12* | (2006.01) |

(52) U.S. Cl.
CPC ............ *B60R 16/0315* (2013.01); *B60L 1/00* (2013.01); *B60L 11/12* (2013.01); *B60L 15/20* (2013.01); *B60W 20/00* (2013.01); *Y10S 903/907* (2013.01)

(58) Field of Classification Search
CPC ....... B60R 16/0315; B60L 1/00; B60L 15/20; B60L 11/12; B60W 20/00; Y10S 903/907
USPC ............ 701/22; 903/907; 180/65.245, 65.25, 180/65.285, 65.29; 318/801, 139, 140, 148
See application file for complete search history.

(56) References Cited

U.S. PATENT DOCUMENTS

| | | | | |
|---|---|---|---|---|
| 5,589,743 | A  * | 12/1996 | King ............................... | 318/139 |
| 6,909,201 | B2 | 6/2005 | Murty et al. | |
| 8,593,101 | B2 * | 11/2013 | Iwahori ......................... | 318/801 |
| 2013/0066492 | A1 | 3/2013 | Holmes et al. | |

\* cited by examiner

*Primary Examiner* — Marthe Marc-Coleman
(74) *Attorney, Agent, or Firm* — Quinn Law Group, PLLC

(57) ABSTRACT

A vehicle includes an engine, a transmission connected to the engine, an auxiliary electrical load, and an electrical system. The electrical system includes a high-voltage energy storage system (HV-ESS), an auxiliary/low-voltage energy storage system (LV-ESS) connected to the load, a full-bridge active rectifier/inverter, a semi-active auxiliary rectifier, and a motor generator unit (MGU) connected to the HV-ESS via the active rectifier/inverter, and to the LV-ESS via the semi-active auxiliary rectifier. A controller establishes a first operating mode in which the MGU is operated as a motor for restarting or assisting the engine via the active rectifier/inverter, and second operating mode in which the MGU operates as a generator and the semi-active rectifier provides an auxiliary DC output voltage to the LV-ESS and the load. Another vehicle has first and second switches in lieu of the semi-active rectifier, with the active rectifier connected to the HV-ESS and LV-ESS via different switches.

20 Claims, 2 Drawing Sheets

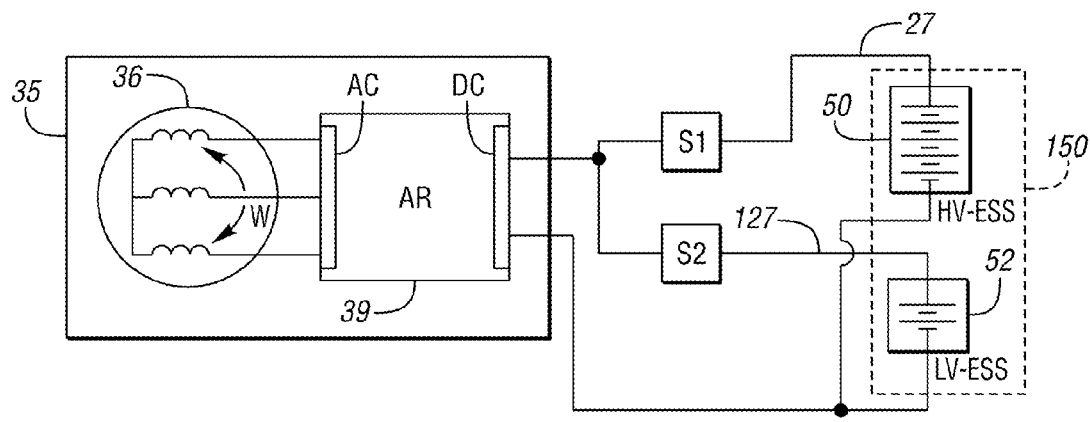
FIG. 4
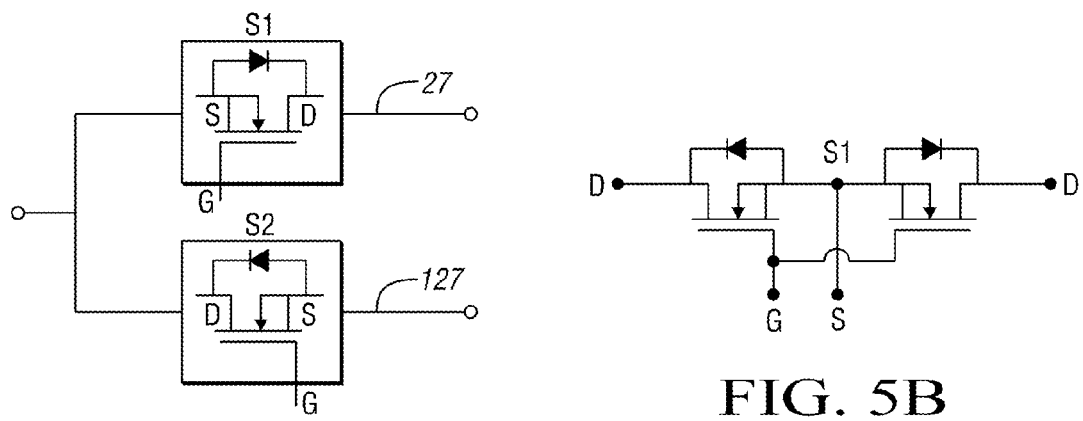
FIG. 5A
FIG. 5B
FIG. 6

MOTOR GENERATOR UNIT WITH MULTIPLEXED OUTPUT

TECHNICAL FIELD

The present disclosure relates to a motor generator unit having a multiplexed output.

BACKGROUND

Hybrid electric powertrains typically have engine autostop functionality in which a controller shuts off a fuel feed to an internal combustion engine during idle conditions in order to maximize fuel economy. A belted alternator starter (BAS) system may be used in conjunction with or in lieu of an auxiliary starter motor to quickly restart the engine after the autostop event, or to assist the engine during specific operating conditions to increase torque into or from a transmission. In a BAS system, a high-voltage motor-generator unit (MGU) is operatively connected to a crankshaft of the engine via pulleys and a chain or belt. Motor torque from the MGU cranks and starts the engine during an engine autostart event. Motor torque from the MGU in some BAS systems may also be used to selectively assist output torque from the engine in an electrical assist mode.

The MGU of a BAS system suitable for a wide range of engines is typically rated for voltages higher than 12-15 VDC auxiliary levels so as to minimize operating current. A higher-voltage battery is thus used for powering the MGU and other higher-voltage electrical devices such as positive temperature coefficient (PTC) heaters, coolant pumps, active chassis control devices, and the like. A separate lower-voltage auxiliary battery is used to run various motor vehicle accessories such as headlights, heating, ventilation, and air conditioning (HVAC) devices, auxiliary motors, and entertainment system components. The auxiliary battery may be recharged in some configurations via a DC-DC converter, a device which reduces an output voltage of the higher-voltage battery to suitable auxiliary voltage levels.

SUMMARY

A vehicle is disclosed herein having an internal combustion engine, a transmission that is connected to the engine, and an electrical system having a controller. The electrical system also includes a polyphase motor generator unit (MGU), a polyphase full-bridge active rectifier/inverter, a polyphase semi-active auxiliary rectifier, a high-voltage energy storage system (HV-ESS), and an auxiliary/low-voltage energy storage system (LV-ESS), with "high-voltage" referring to voltage levels in excess of auxiliary voltage levels. The electrical system, in all of the embodiments disclosed herein, is characterized by an absence of a conventional DC-DC converter of the type noted above. While a three-phase MGU is described hereinafter for illustrative consistency, any polyphase electric machine may be used within the intended inventive scope.

The controller, via switching commands, controls the full-bridge active rectifier/inverter, i.e., selectively activates the gates of internal semiconductor switches of the active rectifier/inverter, to thereby control the MGU as either a generator or a motor as needed. Control of the MGU is powered via energy from the HV-ESS, e.g., a 16-48 VDC multi-cell rechargeable lithium ion battery or an ultra-capacitor.

In addition to the active rectifier/inverter, the phase windings of the MGU in one embodiment are also connected to the semi-active auxiliary rectifier. While motoring or when regenerating the LV-ESS, the semi-active rectifier is controlled to output a lower DC output voltage than that of the HV-ESS. The voltage output of the semi-active rectifier is connected to the LV-ESS, e.g., a 12 VDC lead acid, lithium ion, or other energy storage device, that supports the vehicle's auxiliary electrical load when the vehicle engine is stopped, with the electrical load possibly including a 12 VDC auxiliary starter motor. Such a starter motor may be used for engine cold cranking, and may act as a backup starting source to a belted alternator starter (BAS) system after an engine autostop event.

In another powertrain operating mode, the MGU may be operated via the controller in the capacity of a motor to thereby output torque for restarting or assisting the engine. This occurs using the voltage output of the full-bridge active rectifier/inverter, which in the motoring mode is operated solely as an inverter. This action supplies high-voltage AC power to the phase windings of the MGU. During an engine autostart or torque assist event, the semi-active bridge rectifier may be temporarily disabled by the controller so as to enable delivery of a maximum amount of starting torque to the crankshaft, thereby achieving a rapid engine restart or torque assist.

In other embodiments, solid state switches or semiconductor switches are used to block the flow of electrical current to the DC bus connected to either the HV-ESS or the LV-ESS, with the particular activated switch depending on the desired operating mode. The semi-active auxiliary rectifier may be dispensed with when the switches are used. The switches may have a relatively fast switching speed, for instance of less than 1 ms in a non-limiting example embodiment, with one switch connecting the output of the full-bridge active rectifier/inverter to the positive side of a high-voltage DC bus and another switch connecting the same rectifier/inverter to the positive side of a low-voltage DC bus.

When regenerating the HV-ESS in this particular embodiment, a first switch disposed between the active rectifier/inverter and the HV-ESS is closed and a second switch disposed between the active rectifier/inverter and the LV-ESS is opened, with this accomplished via transmission of switching signals to the switches from the controller. To regenerate the LV-ESS, the opposite switching states are commanded by the controller, i.e., the first switch is opened and the second switch is closed. Excitation of the MGU may be increased via the controller during regeneration of the HV-ESS, such as by increasing the field current or magnetic flux current of the MGU and decreasing the same, during regeneration of the LV-ESS.

In a non-limiting example embodiment, the vehicle may include an internal combustion engine having a crankshaft, a transmission having an input shaft that is connected to the crankshaft, an auxiliary electrical load, and an electrical system. The electrical system may include an HV-ESS, an LV-ESS that is electrically connected to an auxiliary electrical load of the vehicle, a polyphase full-bridge active rectifier/inverter, a polyphase semi-active auxiliary rectifier, a polyphase MGU, and a controller. The MGU is electrically connected to the HV-ESS via the active rectifier/inverter, and to the LV-ESS via the semi-active auxiliary rectifier.

The controller in this embodiment includes a processor and memory on which is recorded instructions for controlling the electrical system to establish a plurality of powertrain operating modes, i.e., a first operating mode and a second operating mode. In the first operating mode, the MGU is operated as a motor for restarting or assisting the engine using an output of the full-bridge active rectifier/inverter to supply AC power to windings of the MGU and the semi-active bridge rectifier is temporarily disabled. In the second operating mode, the MGU is operated via signals from the controller as a generator, where output of the full-bridge active rectifier/inverter is controlled to supply DC power to the HV-ESS and the semi-active bridge rectifier is controlled, also via signals from the controller, to provide an auxiliary DC output voltage to the LV-ESS and the auxiliary electrical load.

The auxiliary electrical load may include an auxiliary starter motor, and the full-bridge active rectifier/inverter may include a plurality of metal-oxide semiconductor field effect transistors (MOSFETs) or other semiconductor switches. The semi-active auxiliary rectifier may include a plurality of diodes and a plurality of solid state AC switches in communication with the controller, i.e., switches capable of blocking voltage of either polarity when commanded off. Example alternative solid state AC switches include thyristors and back-to-back connected MOSFETs.

The active rectifier/inverter and the semi-active auxiliary rectifier are electrically connected to different turns of the windings of the MGU in another optional embodiment. Additionally, the HV-ESS and the LV-ESS may be housed or packaged together in a common battery housing. Likewise, the MGU may have a single frame, and the active rectifier/inverter and the semi-active auxiliary rectifier may be housed within the single frame.

In another embodiment, a vehicle includes an internal combustion engine having a crankshaft, a transmission having an input shaft that is connected to the crankshaft, an auxiliary electrical load, and an electrical system. The electrical system includes an HV-ESS, an LV-ESS that is electrically connected to the auxiliary electrical load, and a polyphase full-bridge active rectifier/inverter having a DC bus connection point, i.e., a physical electrical connection to a DC bus. The electrical system also includes a first switch positioned between the DC bus connection point and the HV-ESS, a second switch positioned between the DC bus connection point and the LV-ESS, a polyphase MGU that is electrically connected to AC bus connection points of the active rectifier, and a controller.

The controller in this embodiment has a processor and memory on which is recorded instructions for controlling the electrical system to establish a plurality of powertrain operating modes. Execution of the instructions by the processor causes the controller to establish a first operating mode or a second operating mode. In the first operating mode, the first switch is closed and the second switch is opened, via switching signals from the controller, to thereby operate the MGU as either a motor for restarting the engine or a generator for charging the HV-ESS. In the second operating mode, the first switch is opened and the second switch is closed to recharge the LV-ESS.

An electrical system for the vehicle is also disclosed. The electrical system includes an HV-ESS, an LV-ESS, a polyphase full-bridge active rectifier/inverter having a DC bus connection point, a first switch positioned between the DC bus connection point and the HV-ESS, a second switch positioned between the DC bus connection point and the LV-ESS, a polyphase MGU electrically connected to AC bus connection points of the active rectifier, and a controller. The controller includes a processor and memory on which is recorded instructions for controlling the electrical system to establish a plurality of powertrain operating modes. As with the above described vehicle embodiment, the execution of the instructions by the processor causes the controller to establish a first operating mode in which the first switch is closed and the second switch is opened via switching signals from the controller to operate the MGU as either a motor for restarting or assisting the engine, or a generator for providing power to the HV-ESS and any HV loads, and a second operating mode in which the first switch is opened and the second switch is closed to supply power to the LV-ESS and any LV auxiliary loads.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic illustration of an alternative portion of the electrical system of the vehicle shown in FIG. 1 with optional solid state switches.

FIG. 5A is a schematic illustration of an optional semiconductor switch embodiment usable in lieu of the solid state switches of FIG. 4.

FIG. 5B is a schematic illustration of an alternative embodiment of the semiconductor switches shown in FIG. 5A.

FIG. 6 is a table describing the various switching states and controlled operating modes of the systems shown in FIGS. 4-5B.

DETAILED DESCRIPTION

Figure 1:
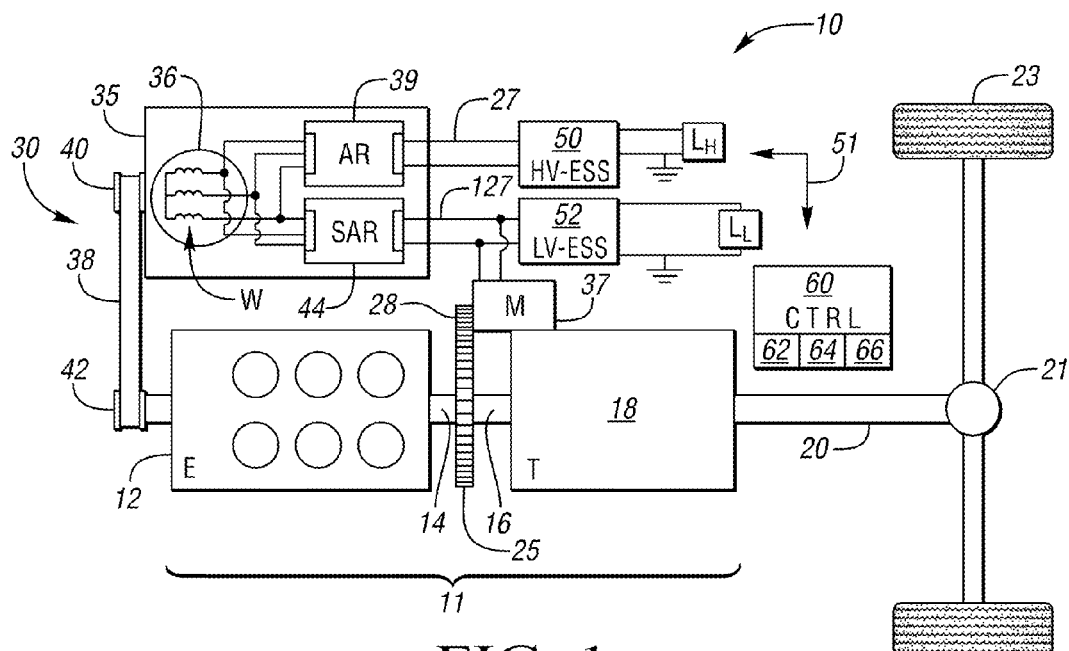
FIG. 1 is a schematic illustration of a vehicle having an electrical system with a high-voltage motor generator unit (MGU) having a multiplexed output as set forth herein.

Referring to the drawings, wherein like reference numbers refer to like components throughout the several views, FIG. 1 depicts a schematic example vehicle 10 having a hybrid electric powertrain 11. The powertrain 11 includes an internal combustion engine (E) 12 with a crankshaft 14 that is operatively connected to an input member 16 of a transmission (T) 18. The transmission 18 may include a gearing arrangement and clutches (not shown) through which torque flows from the input member 16 to an output member 20, and ultimately through a final drive 21 to drive wheels 23 of the vehicle 10.

The engine 12 may include a flywheel 25 that rotates in conjunction with the crankshaft 14. Two different components for starting the engine 12 are operatively connectable to the crankshaft 14: an auxiliary starter motor (M) 37 and a polyphase, high-voltage motor generator unit (MGU) 36. The auxiliary starter motor 37 is operatively connectable to the crankshaft 14, e.g., through a gear element 28. A solenoid (not shown) may be selectively energized to engage the starter motor 37 with the flywheel 25 when torque is needed from the auxiliary starter motor 37 to crank and start the engine 12.

The MGU 36 is also operatively connectable to the crankshaft 14 and operable for starting the engine 12. In a possible embodiment, the MGU 36 may be embodied as an alternating current (AC) electric machine having a motor housing or frame 35, with the MGU 36 shown in the Figures an example three-phase AC electric machine. In various example embodiments, the MGU 36 may be constructed as a wound-field synchronous machine, a wound-field claw pole (Lundell) synchronous machine, a permanent magnet embedded claw pole (Lundell) machine, a permanent magnet synchronous machine, or a synchronous reluctance machine with or without permanent magnets within its rotor. The MGU 36 may also be an induction machine.

The MGU 36 of FIG. 1 is operatively connected to the crankshaft 14 by a drive train 30. The drive train 30 may include a belt 38 that engages with a first pulley 40 that is connected to and rotatable with a shaft (not shown) of the MGU 36 and with a second pulley 42 connected to and rotatable with the crankshaft 14. Construction and use of the MGU 36 in this manner is referred to as a belted alternator starter (BAS) system. The MGU 36 in such an embodiment may be powered via a voltage of between 24-48 VDC in a non-limiting example embodiment. Alternatively, the drive train 30 may include a chain in lieu of the belt 38, and sprockets in lieu of the respective first and second pulleys 40 and 42, or any other suitable drive system.

The hybrid electric powertrain 11 shown in FIG. 1 includes an electrical system 13 having a polyphase, full-bridge active rectifier/inverter (AR) 39, a high-voltage energy storage system (HV-ESS) 50, an auxiliary/low-voltage energy storage system (LV-ESS) 52, and a controller (CTRL) 60. The HV-ESS 50 and the LV-ESS 52 may be separate energy storage devices as shown, or they may be designated portions of a single battery pack, e.g., a 48 VDC stack with three terminals where the full stack is used to supply 48 VDC portion and a lower quarter of the stack is used to supply the auxiliary 12 VDC portion.

Figure 2:
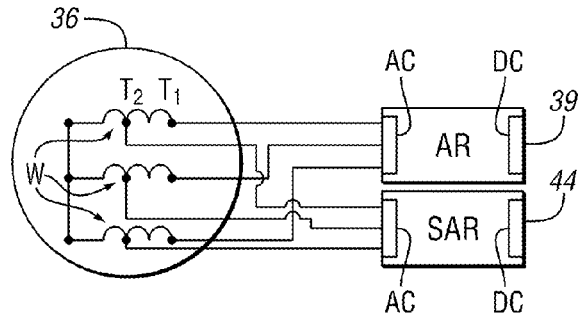
FIG. 2 is a schematic circuit diagram of the electrical system of the vehicle shown in FIG. 1 according to an alternative tapped winding embodiment.

In some configurations, such as the example embodiments shown in FIGS. 1 and 2, the hybrid electric powertrain 11 also includes a polyphase, semi-active auxiliary rectifier (SAR) 44. The embodiment of FIGS. 1 and 2 eliminates the DC-DC converter/accessory power module (APM) of the prior art by providing dual-voltage regulation via the rectifier/inverter 39 and the semi-active rectifier 44, which may be housed within the frame 35 of the MGU 36 as shown. Such a design may help to reduce system cost, mass, and packaging size.

The MGU 36 of FIG. 1 is electrically connected to the full-bridge active rectifier/inverter 39, and via the rectifier 39 to the HV-ESS 50, via a high-voltage DC bus 27, so that the controller 60 can control the operation of the MGU 36 as a generator or as a motor as needed via energy from the HV-ESS 50. The phase windings (W) of the MGU 36 are also connected to the semi-active auxiliary rectifier 44, which is then phase controlled via the controller 60 to provide a lower DC voltage output than that of the HV-ESS 50. The semi-active auxiliary rectifier 44 is electrically connected to the LV-ESS 52 via a low-voltage DC bus 127, which in turns supports most of the auxiliary electrical load (L) of the vehicle 10. Although shown separately for illustrative clarity in FIG. 1, the electrical load (L) may include the optional auxiliary starter motor 37 shown in FIG. 1.

Referring briefly to FIG. 2, in an alternative tapped winding arrangement the MGU 36 is connected to the full-bridge active rectifier/inverter (AR) 39 and different partial turns (T2, T1) of the phase windings (W). For example, the semi-active rectifier 44 may be connected to partial turns T2 of the phase windings W, while the full-bridge active rectifier/inverter 39 is connected to partial turns T1, with the turn numbers being nominal for the purpose of simplicity.

Key to this particular design is that the active rectifier/inverter 39 and the semi-active auxiliary rectifier 44 are electrically connected to different turns of the phase windings W of the MGU 36 so as to minimize voltage stresses and output ripple, particularly of the semi-active auxiliary rectifier 44.

The tapped phase windings (W) in this embodiment are connected to AC bus connection points (AC) of each of the active rectifier/inverter (AR) 39 and the semi-active auxiliary rectifier (SAR) 44, with DC bus connection points (DC) connected to the HV-ESS 50 and the LV-ESS 52 of FIG. 1, respectively.

Referring again to FIG. 1, the controller 60 may be configured as a single or distributed control device that is electrically connected to or otherwise placed in hard-wired or wireless communication with each of the engine 12, the MGU 36, the HV-ESS 50, and the LV-ESS 52, via control channels 51. The control channels 51 may include any required transfer conductors, for instance a hard-wired or wireless control link(s) or path(s) suitable for transmitting and receiving the necessary electrical control signals for proper power flow control and coordination aboard the vehicle 10. The controller 60 may include such control modules and capabilities as might be necessary to execute all required power flow control functionality aboard the vehicle 10 in the desired manner.

The controller 60 may include a processor 62 and tangible, non-transitory memory 64, e.g., read only memory (ROM), whether optical, magnetic, flash, or otherwise. The controller 60 may also include sufficient amounts of random access memory (RAM), electrically-erasable programmable read only memory (EEPROM), and the like, as well as a high-speed clock, analog-to-digital (A/D) and digital-to-analog (D/A) circuitry, and input/output circuitry and devices (I/O) 66, as well as appropriate signal conditioning and buffer circuitry.

The configurations of FIGS. 1 and 2 allow for two possible control modes: (I) an engine autostart or engine assist mode, and (II) a generator mode. In mode (I), the MGU 36 is operated as a motor delivering torque to the engine 12 when restarting or assisting the engine 12. The controller 60 uses the active rectifier/inverter 39 as an inverter in mode (I). This includes supplying AC power from the HV-ESS 50 for a fast restart or torque assist of the engine 12.

For mode (II), i.e., generator mode, the voltage output of the HV-ESS 50 is controlled via the controller 60 by field excitation of the MGU 36, i.e., from the controlled rotation of the engine 12 in combination with phase angle retardation control of the semi-active auxiliary rectifier 44. For illustrative clarity, the controller 60 is shown in FIG. 1 outside of the frame 35. However, the controller 60 may be further optimized by integrating starter/engine assist/primary control functions and the auxiliary control function into a single controller within the frame 35 of the MGU 36, along with any power electronics including the full-bridge active rectifier/inverter 39 and the semi-active auxiliary rectifier 44.

Figures 3A, 3B:
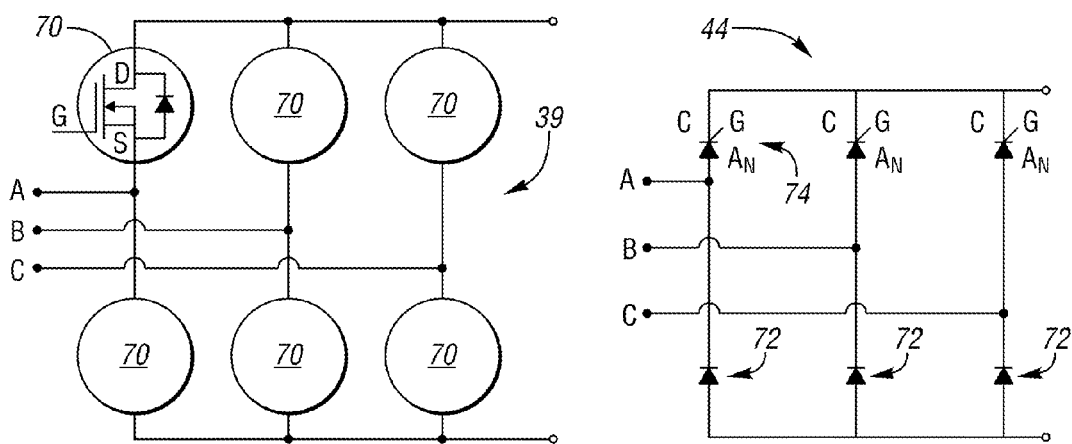
FIG. 3A is a schematic circuit diagram of an example embodiment of a full-bridge active rectifier that may be used as part of the electrical system of the vehicle shown in FIG. 1.
FIG. 3B is a schematic circuit diagram of an example embodiment of a semi-active rectifier that may be used as part of the electrical system of the vehicle shown in FIG. 1.

Example internal detail of the full-bridge active rectifier/inverter 39 and the semi-active auxiliary rectifier 44 of FIGS. 1 and 2 are shown in FIGS. 3A and 3B, respectively. In FIG. 3A, the full-bridge active rectifier/inverter 39 may be embodied as a set of semiconductor switches 70 electrically connected to the A, B, and C phase leads of the phase windings (W) of the MGU 36. Each of the semiconductor switches 70 may be configured, e.g., as metal-oxide semiconductor field effect transistors (MOSFETs) as shown.

The three terminals of the example MOSFET shown in FIG. 3A are labeled as a gate (G), a source (S), and a drain (D). The controller 60 of FIGS. 1 and 2 is configured to selectively activate, i.e., turn on or off, any of the semiconductor switches 70 as needed via a voltage pulse to delivered to the gate (G), e.g., via the control channels 51 of FIG. 1. Thus, electrical current flowing to or from the MGU 36 is closely controlled via precise switching of the various semiconductor switches 70. Other embodiments may use other switching devices, for instance insulated gate bipolar transistors (IGBTs) or semiconductor-controlled rectifiers (SCRs), for instance solid state AC switches such as thyristors.

The semi-active auxiliary rectifier 44 shown in FIG. 3B, as the name implies, is only partially controlled via the controller 60. Unlike the full-bridge active rectifier/inverter 39 of FIG. 3A, the semi-active auxiliary rectifier 44 of FIG. 3B has passive control elements in the form of diodes 72 and controllable elements with bidirectional (AC) voltage blocking capability in the form of, for example, SCRs 74. The SCRs 74 may be embodied as multi-layer, unidirectional current control devices such as the example thyristors as shown, with each SCR 74 having a gate (G), an anode (An), and a cathode (C). As is well known in the art, whenever a control voltage applied to the gate (G) and the cathode (C) exceeds a calibrated threshold, which is a quality of the particular thyristor/SCR 74 that is used, the thyristor/SCR 74 is switched on, and thereafter conducts electrical current.

In a thyristor or an SCR, the terms "latching current" refers to the gate trigger current, i.e., a measure of the minimum electrical current applied to the gate (G) to ensure the SCR 74 will turn on. The term "holding current" is the minimum current flowing between the anode (An) and cathode (C), after termination of the gate current, needed for ensuring that the thyristor/SCR 74 remains on and conducting. Thus, the thyristors/SCRs 74 of FIG. 3B remain on/conducting as long as the conducted current remains at the holding current level. Once the current flow falls below the holding current for a particular period of time unique to the design of the thyristor/SCR 74 being used, the thyristor/SCR 74 will switch itself off. If the gate (G) is pulsed and the current flowing through the thyristor/SCR 74 is below the latching current, the thyristor/SCR 74 will remain in the off state. The particular configuration of FIG. 3B is just one possible example of the semi-active rectifier 44. For instance, other approaches may reverse the positions of the diodes 72 and the SCRs 74 in FIG. 3B, such that the diodes 72 are located where the SCRs 74 are shown and vice versa. The SCRs 74 can be replaced with back-to-back series connected MOSFETs as shown in FIG. 5B with a voltage applied to gate G, and with the source S used for turning the switch on or off as needed.

The designs depicted in FIGS. 1-3B are able to control a single-frame MGU such as the MGU 36 via the full-bridge active rectifier/inverter (AR) 39 as either a generator or a motor, doing so using high-voltage energy from the HV-ESS 50. In some embodiments, the HV-ESS 50 may be a lithium-ion rechargeable, multi-cell battery pack rated for 48 VDC or more, or a super-capacitor or ultra-capacitor. A capacitive device may be suitable for rapid delivery of the necessary cranking current.

As noted above, the phase windings W of the MGU 36 are also connected to the semi-active auxiliary rectifier (SAR) 44, with the controller 60 controlling the phase of the SAR 44 to provide a lower DC voltage output than that of the HV-ESS 50. Such an output can be harnessed to recharge to the LV-ESS 52 or to power the auxiliary electrical load (L). The LV-ESS 52 in turn can support the auxiliary electrical load (L) whenever the engine 12 is stopped. When restarting or providing torque assist to the engine 12, the MGU 36 is controlled as a motor using the active rectifier/inverter 39 to supply the necessary AC power from the HV-ESS 50. The controller 60 can temporarily disable the semi-active auxiliary rectifier 44 during engine restart or assist so as to ensure that maximum torque is made available to the engine 12 by the MGU 36.

Referring to FIG. 4, in an alternative embodiment, the semi-active auxiliary rectifier 44 of FIGS. 1 and 2 may be eliminated from the design. The DC output side of the full-bridge active rectifier/inverter (AR) 39 is connected via the high-voltage DC bus 27 and the low-voltage DC bus 127 to a respective pair of switching devices, i.e., respective first and second switches S1 and S2. In the example embodiment of FIG. 4, the switches S1, S2 are both solid-state devices, relays, or contactors. The HV-ESS 50 and the LV-ESS 52 may be optionally housed together in a single battery housing 150, for instance with three terminals separating a high-voltage stack of 48 VDC from a low-voltage stack of 12 VDC.

Referring briefly to FIGS. 5A and 5B, in another possible embodiment the switches S1, S2 may be configured as semiconductor switching devices, e.g., IGBTs or MOSFETS as shown, which may be optionally integrated into the frame 35 of the MGU 36 or, alternatively, into the HV-ESS 50 and LV-ESS 52. In FIGS. 5A and 5B, the gate, drain, and source are labeled as G, D, and S, respectively. The switches S1, S2 are oriented to provide the output multiplexing function in a generator mode. When the gate signal to the first switch S1 is disabled by the controller 60, the high-voltage DC bus 27 is isolated when voltage from the MGU 36 in generator mode is reduced to match that of the low-voltage DC bus 127. Likewise, when the gate signal to switch S2 is disabled by the controller 60, the low-voltage DC bus 127 is isolated when the voltage from the MGU 36 in generator mode is raised to the level of the high-voltage DC bus 27.

The optional embodiment of FIG. 5B illustrates a series back-to-back connection of MOSFETS in the first switch S1 to block current flow in both directions when the first switch S1 is turned off. Although omitted for simplicity, the switch S2 may be configured in the same manner. Such a configuration may help to prevent an unintended discharge of power from the HV-ESS 50 or LV-ESS 52 during certain types of electrical faults.

Referring to FIG. 6, a table 80 depicts possible switching states and resultant control modes for the optional design shown in FIG. 4. During motoring and regeneration of the HV-ESS 52, as indicated by M/REG in FIG. 6, the switching device S1 is closed/switched on (X) and S2 is opened/switched off (O) by the controller 60. As the second switch S2 connects the DC bus of the active rectifier/inverter 39 to the positive side of the low-voltage DC bus 127, this particular switching action effectively disconnects the LV-ESS 52 of FIG. 4 from the active rectifier/inverter 39.

During regeneration of the LV-ESS 52, the first switch S1 is commanded to open by the controller 60 and the switching device S2 is commanded to close. As the first switch S1 connects the DC bus of the active rectifier 39 to the positive side of the high-voltage DC bus 27, this switching action disconnects the HV-ESS 50 from the active rectifier/inverter 39. In this embodiment, the LV-ESS 52 of FIG. 4 provides a stable voltage to the auxiliary electrical load (L) during engine auto-start/assist and regeneration modes. Excitation of the MGU 36 may be reduced for low-voltage regeneration, and enhanced for high-voltage regeneration or when restarting of or providing torque assist to the engine 12.

The disclosed design of FIGS. 1-6 is intended to provide low-cost engine belt-driven start/stop operation with torque boost and braking energy regeneration capability. The conventional DC-DC converter typically used for a dual-voltage electrical system is eliminated, thereby reducing substantial cost and mass. The system disclosed herein also reduces packaging space and integration costs associated with use of the DC-DC converter, while reducing controller costs via integration of starter/primary voltage control function and the auxiliary voltage control function into a single controller.

While the best modes for carrying out the invention have been described in detail, those familiar with the art to which this invention relates will recognize various alternate designs and embodiments for practicing the invention within the scope of the appended claims.

The invention claimed is:

1. A vehicle comprising:
    an internal combustion engine having a crankshaft;
    a transmission having an input shaft that is connected to the crankshaft;
    an auxiliary electrical load;
    a high-voltage (HV) electrical load; and
    an electrical system that includes:
        a high-voltage energy storage system (HV-ESS) that is electrically connected to the HV electrical load;
        an auxiliary/low-voltage energy storage system (LV-ESS) that is electrically connected to the auxiliary electrical load;
        a polyphase full-bridge active rectifier/inverter;
        a polyphase semi-active auxiliary rectifier;
        a polyphase motor generator unit (MGU) electrically connected to the HV-ESS via the active rectifier/inverter, and to the LV-ESS via the semi-active auxiliary rectifier; and
        a controller having a processor and memory on which is recorded instructions for controlling the electrical system to establish a plurality of powertrain operating modes, wherein execution of the instructions causes the processor to execute a first operating mode in which the MGU is operated as a motor for restarting or assisting the engine using an output of the full-bridge active rectifier/inverter to supply AC power to phase windings of the MGU, and in which the semi-active bridge rectifier is temporarily disabled, and a second operating mode in which the MGU is controlled as a generator via the controller, an output of the full-bridge active rectifier/inverter supplies DC power to the HV-ESS and the HV electrical load, and the semi-active bridge rectifier provides an auxiliary DC output voltage to the LV-ESS and the auxiliary electrical load.

2. The vehicle of claim 1, wherein the auxiliary electrical load includes an auxiliary starter motor.

3. The vehicle of claim 1, wherein the full-bridge active rectifier/inverter includes a plurality of semiconductor switches.

4. The vehicle of claim 3, wherein the plurality of semiconductor switches are MOSFETs.

5. The vehicle of claim 1, wherein the polyphase semi-active auxiliary rectifier includes a plurality of diodes and a plurality of thyristors in communication with the controller.

6. The vehicle of claim 1, wherein the full-bridge active rectifier/inverter and the semi-active auxiliary rectifier are electrically connected to different turns of the phase windings of the MGU.

7. The vehicle of claim 1, wherein the HV-ESS and the LV-ESS are housed together in a single battery housing.

8. The vehicle of claim 1, wherein the MGU has a single frame, and wherein the full-bridge active rectifier/inverter and the semi-active auxiliary rectifier are housed within the single frame.

9. A vehicle comprising:
    an internal combustion engine having a crankshaft;
    a transmission having an input shaft that is connected to the crankshaft;
    an auxiliary electrical load;
    a high-voltage (HV) electrical load; and
    an electrical system that includes:
        a high-voltage energy storage system (HV-ESS) that is electrically connected to the HV electrical load;
        an auxiliary/low-voltage energy storage system (LV-ESS) that is electrically connected to the auxiliary electrical load;
        a polyphase full-bridge active rectifier/inverter having an AC bus connection point;
        a first switch positioned between the DC bus connection point and the HV-ESS;
        a second switch positioned between the DC bus connection point and the LV-ESS;
        a polyphase motor generator unit (MGU) electrically connected to the AC bus connection point of the active rectifier; and
        a controller having a processor and memory on which is recorded instructions for controlling the electrical system to establish a plurality of powertrain operating modes, wherein execution of the instructions by the process causes the controller to establish a first operating mode in which the first switch is closed and the second switch is opened via switching signals from the controller to operate the MGU as either a motor for restarting or assisting the engine or a generator for supplying HV power to the HV-ESS and the HV electrical load, and a second operating mode in which the first switch is opened and the second switch is closed to supply power to the LV-ESS and the auxiliary electrical load.

10. The vehicle of claim 9, wherein the first switch and the second switch are solid-state devices, relays, or contactors.

11. The vehicle of claim 9, wherein the first switch and the second switch are semiconductor switches.

12. The vehicle of claim 11, wherein the semiconductor switches are MOSFETs.

13. The vehicle of claim 12, wherein the MOSFETS of the respective semiconductor switches are arranged in a series back-to-back configuration.

14. The vehicle of claim 9, wherein the MGU has a single frame, and wherein the active rectifier/inverter and the first and second switches are housed within the single frame.

15. An electrical system for a vehicle having an internal combustion engine, a transmission, a high-voltage (HV) electrical load, and an auxiliary electrical load, the electrical system comprising:
    a high-voltage energy storage system (HV-ESS);
    an auxiliary/low-voltage energy storage system (LV-ESS) that is electrically connected to the auxiliary electrical load;
    a polyphase full-bridge active rectifier/inverter having a DC bus connection point;
    a first switch positioned between the DC bus connection point and the HV-ESS;
    a second switch positioned between the DC bus connection point and the LV-ESS;
    a polyphase motor generator unit (MGU) electrically connected to the active rectifier via an AC bus connection point; and
    a controller having a processor and memory on which is recorded instructions for controlling the electrical system to establish a plurality of powertrain operating modes, wherein execution of the instructions by the processor causes the controller to establish a first operating mode in which the first switch is closed and the second switch is opened via switching signals from the controller to operate the MGU as either a motor for restarting or assisting the engine or a generator for delivering HV power to the HV-ESS and the HV electrical load, and a second operating mode in which the first switch is opened and the second switch is closed to deliver auxiliary power to the LV-ESS and the auxiliary electrical load.

16. The electrical system of claim 15, wherein the first switch and the second switch are solid-state relays or contactors.

17. The electrical system of claim 15, wherein the first switch and the second switch are semiconductor switches.

18. The electrical system of claim 17, wherein the semiconductor switches are MOSFETs.

19. The electrical system of claim 18, wherein the MOSFETS of the respective semiconductor switches are arranged in a series back-to-back configuration.

20. The electrical system of claim 15, wherein the MGU has a single frame, and wherein the active rectifier/inverter and the first and second switches are housed within the single frame.

* * * * *